(12) United States Patent
Gero et al.

(10) Patent No.: US 9,948,674 B2
(45) Date of Patent: *Apr. 17, 2018

(54) SPLICING INTO AN ACTIVE TLS SESSION WITHOUT A CERTIFICATE OR PRIVATE KEY

(71) Applicant: Akamai Technologies, Inc., Cambridge, MA (US)

(72) Inventors: Charles E. Gero, Quincy, MA (US); Michael R. Stone, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,599

(22) Filed: Dec. 26, 2016

(65) Prior Publication Data

US 2017/0104786 A1 Apr. 13, 2017

Related U.S. Application Data

(63) Continuation of application No. 14/850,991, filed on Sep. 11, 2015, now Pat. No. 9,531,682, which is a continuation of application No. 14/268,657, filed on May 2, 2014, now Pat. No. 9,137,218.

(60) Provisional application No. 61/818,979, filed on May 3, 2013.

(51) Int. Cl.
| | |
|---|---|
| H04L 29/06 | (2006.01) |
| H04L 9/06 | (2006.01) |
| H04L 9/14 | (2006.01) |
| H04L 9/32 | (2006.01) |

(52) U.S. Cl.
CPC .......... *H04L 63/166* (2013.01); *H04L 9/0618* (2013.01); *H04L 9/14* (2013.01); *H04L 9/3242* (2013.01); *H04L 63/0272* (2013.01); *H04L 63/0281* (2013.01); *H04L 63/0428* (2013.01)

(58) Field of Classification Search
CPC ............... H04L 63/166; H04L 63/0272; H04L 63/0281; H04L 63/0428; H04L 9/0618; H04L 9/14; H04L 9/3242
USPC ......................................................... 713/151
See application file for complete search history.

(56) References Cited

U.S. PATENT DOCUMENTS

| | | | | |
|---|---|---|---|---|
| 2004/0093419 A1* | 5/2004 | Weihl | ...................... | H04L 63/06 709/229 |
| 2004/0103283 A1* | 5/2004 | Hornak | ................... | H04L 29/06 713/175 |
| 2009/0220080 A1* | 9/2009 | Herne | ................. | H04L 63/0428 380/255 |

(Continued)

*Primary Examiner* — Michael S McNally
(74) *Attorney, Agent, or Firm* — David H. Judson

(57) ABSTRACT

An origin server selectively enables an intermediary (e.g., an edge server) to shunt into and out of an active TLS session that is on-going between a client and the origin server. The technique allows for selective pieces of a data stream to be delegated from an origin to the edge server for the transmission (by the edge server) of authentic cached content, but without the edge server having the ability to obtain control of the entire stream or to decrypt arbitrary data after that point. The technique enables an origin to authorize the edge server to inject cached data at certain points in a TLS session, as well as to mathematically and cryptographically revoke any further access to the stream until the origin deems appropriate.

20 Claims, 2 Drawing Sheets

(56) References Cited

U.S. PATENT DOCUMENTS

2011/0231651 A1* 9/2011 Bollay ................. H04L 63/166
                                                              713/152
2012/0233453 A1* 9/2012 Lev Ran ............ H04L 63/0428
                                                              713/150
2013/0067552 A1* 3/2013 Hawkes ............... H04L 63/166
                                                              726/7

* cited by examiner

US 9,948,674 B2

SPLICING INTO AN ACTIVE TLS SESSION WITHOUT A CERTIFICATE OR PRIVATE KEY

BACKGROUND

Technical Field

This application relates generally to secure network-based communications using cryptographic protocols such as Transport Layer Security (TLS).

Brief Description of the Related Art

Transport Layer Security (TLS) and its predecessor, Secure Sockets Layer (SSL), are cryptographic protocols that provide Internet communication security. They use asymmetric cryptography for authentication and key exchange, symmetric encryption for confidentiality, and message authentication codes for message integrity. TLS/SSL is initialized at a session layer then works at a presentation layer. In particular, first the session layer has a handshake using an asymmetric cipher to establish cipher settings and a shared key for that session. Thereafter, a presentation layer encrypts the rest of the communication using a symmetric cipher and that session key. In both models, TLS and SSL work on behalf of the underlying transport layer, whose segments carry encrypted data. TLS is an IETF standards track protocol, defined in RFC 5246 and RFC 6176.

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

For a traditional RSA-based TLS session, the two sides of a connection agree upon a "pre-master secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the TLS server's publicly available RSA key. This generates an encrypted pre-master secret (ePMS), which is then provided to the TLS server. The TLS server has a private decryption key, which is then used to decrypt the encrypted pre-master secret. At this point, both the client and the server have the original pre-master secret and can use it to generate the symmetric key used for actual encrypted and secure data exchange. Decrypting the encrypted pre-master secret is the only time in the TLS connection that the private key is needed. This decryption occurs at a so-called TLS termination point. Where a CDN is used to facilitate delivery of secure content, the TLS termination point will be located in the CDN.

Some CDN customers are not comfortable sharing their private TLS (RSA, DSA, etc.) keys with the CDN service provider. Further, some customers may require an additional caveat that certain data and requests never be decrypted by the CDN at any point in any transaction, and that the data transmitted by the CDN on behalf of the customer is provably and verifiably authentic.

BRIEF SUMMARY

This disclosure describes a technique that allows for selective pieces of a data stream to be delegated from a customer to a CDN for the transmission of authentic cached content without the CDN having the ability to obtain control of the entire stream or to decrypt arbitrary data after that point. The technique enables a customer to authorize the CDN to inject cached data at certain points in a TLS session, as well as to mathematically and cryptographically revoke any further access to the stream until the origin (the customer) deems appropriate.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DESCRIPTION

Figure 1:
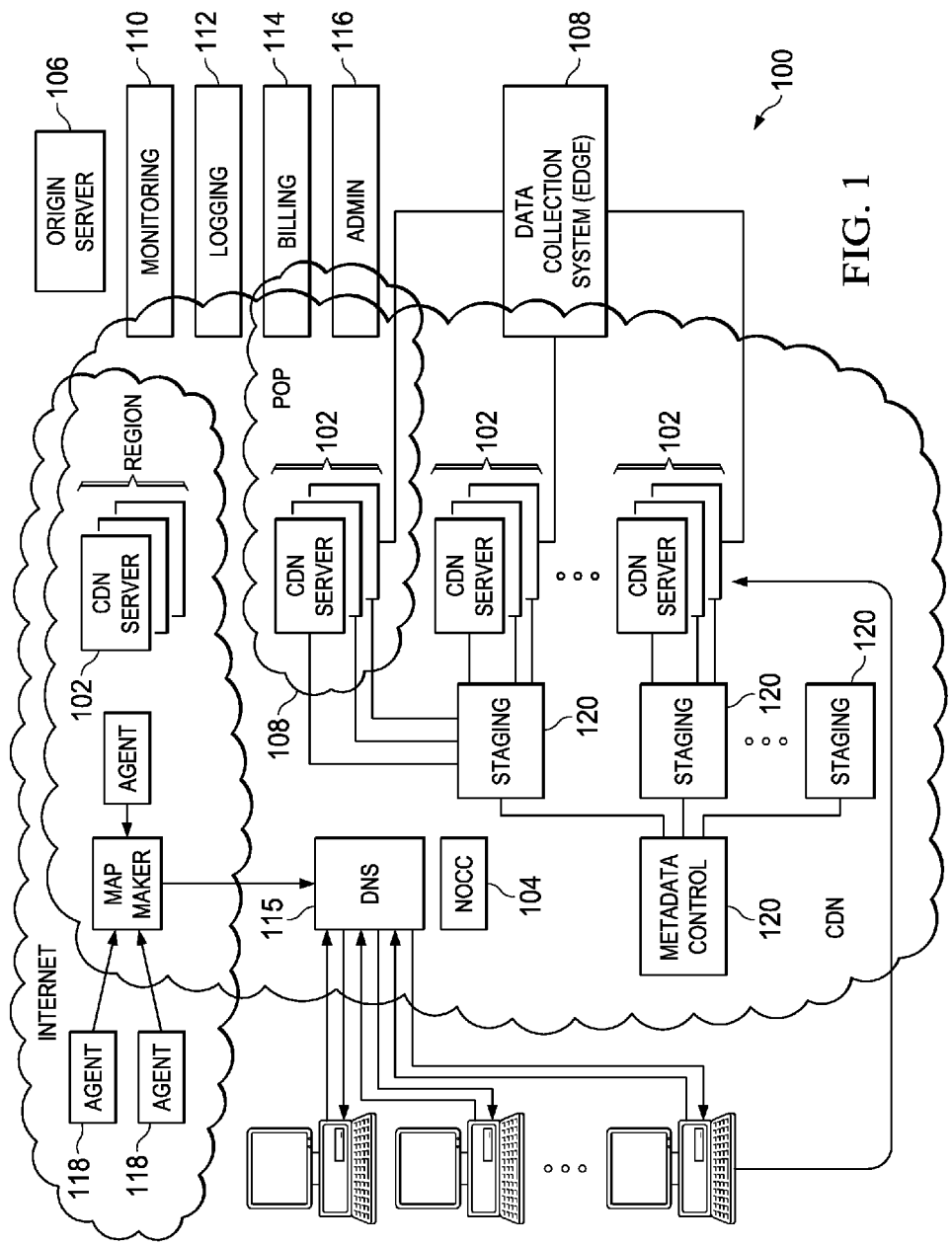
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or subdomains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
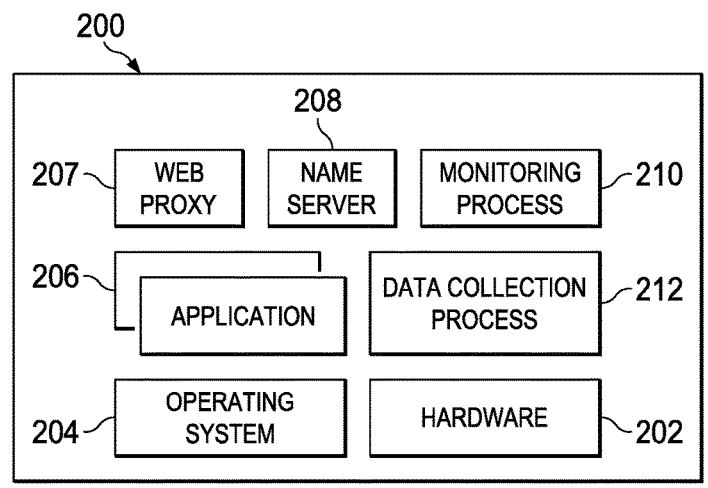
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

Splicing into an Active TLS Session without a Certificate or Private Key

With the above as background, the subject matter of this disclosure is now described. Familiarity with TLS handshaking is presumed.

As used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate. Nevertheless, and as will be seen, the technique of this disclosure enables the customer origin to request that the CDN shunt into and out of a particular TLS-secured session, and the CDN can guarantee that it is complying with this request.

Figure 3:
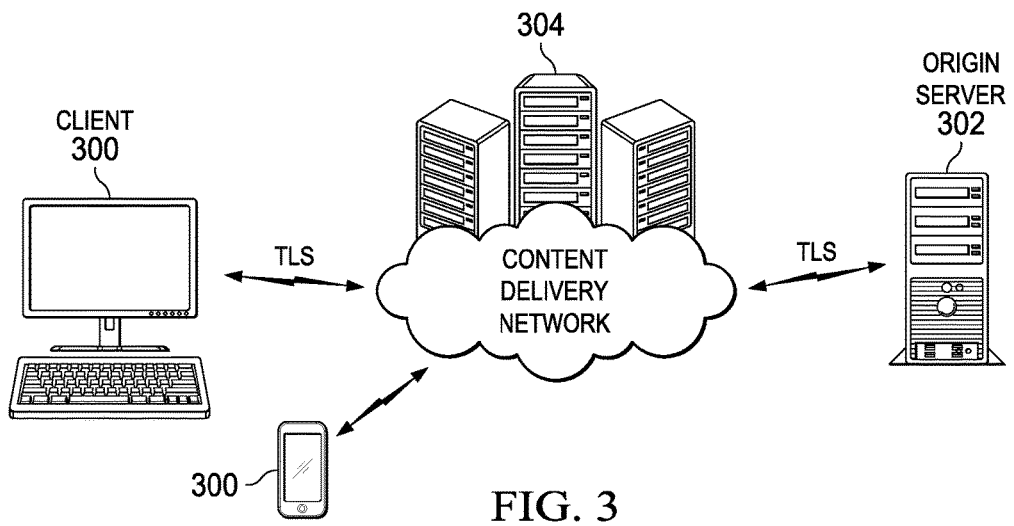
FIG. 3 is a representative active TLS session among a client, an edge server, and an origin server and into which the edge server, with permission, is enabled to shunt into without a certificate and/or private key according to this disclosure.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

The following provides details regarding the TLS handshake between the client 300 and the origin 302. As noted above, the reader's familiarity with the TLS Specification is presumed. The edge machine server instance 304 passes handshake messages through directly to the origin 302, and vice versa. Once the handshake is complete, the origin 302 and client 300 will have negotiated a Pre-Master Secret and exchange random number values for the session. According to the TLS 1.2 Specification Section 8.1, each side will have converted its Pre-Master Secret into a Master Secret using an agreed-upon pseudo-random function (PRF), such as an HMAC variant. The TLS 1.2 Specification Section 6.3 notes that this Master Secret is then converted into a larger key block, which is then used to calculate the following TLS items: client_write_MAC_key (the key that be used as input to the client's sent data message authentication codes (MACs)), wherein each TLSCipherText record has a MAC that verifies the data in the record is authentic and unchanged); server_write_MAC_key (the key that will be used as input to the server's sent data MACs); client_write_key (the key that will be used for the agreed-upon bulk encryption cipher for client sent data; and server_write_key (the key that will be used for the agreed-upon bulk encryption cipher for server sent data). Other items may be calculated but, for purposes of this protocol, are not relevant.

The following provides details regarding the handling of encrypted requests and responses without the TLS splicing (shunting) technique of this disclosure. The requests at this stage are encrypted using the parameters from the TLS handshake described above. In a typical operation, the CDN edge server 304 receives the TLS records (that represent the request) from the client 300 and simply forwards them along to the origin 302, unable to read them due to the encryption. When the response data (from the origin) is private and should not be shared with the CDN, the origin 300 responds back to the edge server 304 using the conventional TLS mechanisms. The edge server 304 receives this data and simply passes it through to the client 300, again unable to read it due to the encryption. At this point, and without reference to the techniques of this disclosure, the edge server 304 thus is simply acting as a pass-through TCP proxy. It can neither decrypt data nor contribute data to the TLS session.

According to this disclosure, the origin 302 may selectively upgrade the edge server 304 to have one or more different capabilities with respect to the TLS session. This is sometimes referred to herein as "splicing" or "shunting" into (and out of) the active TLS session because the edge server, which is otherwise just acting as a pass-through, is enabled to have visibility into the data stream itself. This capability allows for selective pieces of a data stream to be delegated from a customer (the origin) to the CDN edge server for the transmission (from the edge server) of authentic cached content but without the CDN having the ability to obtain control of the entire stream or to decrypt arbitrary data after that point. The technique enables a customer to authorize the CDN to inject cached data at certain points in a TLS session, as well as to mathematically and cryptographically revoke any further access to the stream until the origin (the customer) deems appropriate. The splicing/shunting capability is managed (controlled) by the origin; thus, it is not an operation that the edge server carries out on its own volition.

A first upgrade is a Decryption Upgrade. This specific capability allows the edge server 304 to decrypt data but not to contribute data to the TLS session. The origin 302 performs this upgrade by communicating to the edge machine the value for the current client_write_key (if it is desired to enable the edge server to be able to decrypt client requests), the value for the current server_write_key (if it is desired to enable the edge server to be able to decrypt origin responses), or both. The origin may communicate the client_write key and/or the server_write_key to the edge server either directly or through some out-of-band manner. In any such scenario, preferably MAC keys are not shared by the origin. This upgrade enables the edge machine to decrypt TLS records, but the edge server still is restricted from contributing new data (or changing data) on its own, as it does not possess the necessary keys to produce the MACs that are appended to the end of the TLS records. Thus, the Decryption Upgrade enables the edge server machine to see into the TLS session but not to contribute or change data flowing within that session. Data continues to flow, and the edge machine is able to decode the channels into which it has been given access by the origin.

If the CDN edge machine has been given access (as described above) to watch the client sent data stream, the edge server can determine if it sees a request HTTP method, a particular URL, and/or one or more headers for which it can serve a response (from its local cache). If such a hit occurs, preferably the edge server sends to the origin upstream the TLS record together with a hash of the entire cached object (or some defined portion) it can serve as a response. This hash may be pre-computed and stored with the object, e.g., when it is initially cached, or it may be computed on-the-fly.

Alternatively, if the edge server 304 has not been given access to watch the client sent data stream, the origin 302 may initiate a Cache Hit Request to the edge servers for requests it receives that the origin believes may be serveable from the edge server cache. This message would contain the URL, headers, and any other information that the edge server needs to determine if it has (in cache) the response to the request. If the edge server does contain a cached response, it may send the hash of the object back (as described above), and the origin would then make a determination of what action to take next.

Another capability that may be implemented is the ability of the origin 302 to control the edge server to implement a one-time write grant. This is sometimes referred to herein as a One-Time Write Grant Upgrade. The following describes this process. The capability may be implemented when the origin, upon receiving notice (from the edge server) that the edge server can service the current request from cache. In operation, the origin checks the following: (i) is the response data on the edge server fresh (in other words, does its hash match the origin's current hash?), and (ii) is the request from cache service-able from the edge according to the origin's (the customer's) security policy? If both conditions are true, then the origin may upgrade the edge server to perform one-time write grant by providing the edge server the server_write_key (thus enabling the edge server to be server decrypt-able). To this end, the origin 302 scans over the data (e.g., in an agreed-upon file (16 KB) block by (16K) block manner), generating the TLS records it would have sent had the edge server not been present. More specifically, for each record, the origin generates the MAC for the record using the TLS compressed record data, the sequence number that would be correct at that point, and the server_write_MAC_key. For this upgrade, the MACs generated by the origin are then sent by the origin 302 to the edge server 304. On the edge server, the local system loads the agreed-upon file that matches the hash and, for each 16 KB of plaintext that it reads, it converts that plaintext to a TLS compressed record using an agreed-upon compression algorithm. For each of these records, the edge server now generates a TLSCipherText message using the methods describes in the TLS Specification Section 6.2.3. For example, using the server_write_key (that the origin shares), the edge server encrypts the TLS compressed record fragment, origin-generated MAC, and added padding data for block boundaries (if using a CBC block cipher). Once the record is created, the edge server 304 sends it to the client 300. From the client's perspective, nothing out of the ordinary has occurred. Once the agreed-upon data has been fully sent, however, the edge server is out of MACs and thus can no longer participate in the conversation.

Preferably, the one-time write grant described above expires after the edge server 304 has written the entire file. The decryption keys, however, do not expire. Once the edge server had been given decryption keys (whether from a one-time write grant or otherwise), it can continue to view the stream's contents in the specific direction for which it has a key. The origin 302, however, may wish to revoke (from the edge server) this visibility capability. A determination by the origin server to revoke the visibility may occur at any particular moment, e.g., based on what the origin is about to send or what it expects to receive from the client 300. A revocation of rights capability thus is also enabled, once again under the control of the origin. Preferably, revocation is carried out through renegotiation. In particular, according to this protocol, preferably each request flows completely back to the origin 302 before the origin decides either to service the request itself or give the edge server the one-time write grant described above. If the decision is to serve the content itself (i.e. in a private manner without the edge server being able to view in a meaningful way the data going forward), and if the edge server currently has keys that makes this impossible, the origin 302 issues a TLS HelloRequest message. This message asks the client 300 to begin a renegotiation in which one of three options must occur, referred to as follows: (i) efficient renegotiation, (ii) long renegotiation, or (iii) connection termination. Each of these options is described below.

The efficient renegotiation option works as follows. Upon receiving the TLS HelloRequest message, the client 300 is allowed to request the resumption of a session that it and the origin used previously and that was identified in a SessionID field in the origin's original TLS ServerHello message. Upon receipt of a TLS HelloRequest message, some clients will not only attempt session resumption, but they will actually attempt to perform the resumption using the current session ID that is already in use. As described in TLS 1.2 Specification Section F.1.4, session resumption establishes new pseudo-random numbers and thus new keys. Therefore, clients that perform this action change the underlying keys, thereby removing the decryption capability of the edge server in both directions.

Another option to revoke the edge server's view rights is long renegotiation, which is just a full handshake. This option dumps the current session and involves asymmetric cryptography for key exchange. By changing the underlying keys, this option revokes decryption access for the edge server in both directions.

The final option, connection termination, works as follows. This option may be used to revoke the decryption rights at the edge machine if the client 300 refuses to renegotiate. In this event, the origin 302 may terminate the connection to force a reconnect (and full handshake). Methods that are not idempotent (e.g., POST) are not issued on subsequent requests on a persistent connection (due to the possibility of a timeout occurring on the origin and a shutdown of the connection). Thus, they are inherently safe from the close. For other methods that are idempotent (e.g., GET), and to maintain proper timeout semantics, preferably the client reconnects and replays the request if a persistent connection is closed.

Regardless of which revocation option is initiated, the result is that the edge server receives an indication that is generated in association with the renegotiation. This indication typically is in the form of data indicative of an initiated or completed renegotiation of the active TLS session, and that renegotiation has the effect of revoking the edge server's then-current decryption access to the data stream.

When it is necessary for the edge server to communicate with the origin server (or vice versa) as described herein, such communication may occur over the TLS connection, or over a distinct channel (e.g., a separate TCP connection).

Thus, according to this disclosure, the above-described methods may be used by the origin to exploit the TLS protocol to provide: granting of decryption visibility to the edge server for client sent data, granting of decryption visibility to the edge server for server sent data, revoking from the edge server of decrypting visibility for client sent data, revoking from the edge server of decryption visibility for server sent data, and granting to the edge server one-time write authority, preferably for specific authorized data over specific byte sequences in the stream.

As described herein, the origin server manages splitting or shunting of the active TLS session to enable the edge server visibility; this is the typical operation in the context of a CDN wherein the CDN customer operates the origin server and the client is an end user requesting content. In other scenarios, however, the control over the splitting operation may be managed by the client instead of the origin server, or by both the client and the origin server.

The references to TLS 1.2 are merely exemplary. The techniques described herein may be generalized for use with any cryptographic protocol that uses both (i) asymmetric cryptography to exchange unidirectional symmetric keys, and (ii) separate authentication code keys. Thus, the techniques may be used to shunt an intermediary into an active session for various SSL versions, next-generation TLS, and other such protocols.

The reference to HTTP-based requests and responses is merely exemplary as well. The technique for enabling the intermediary to have visibility into the active cryptographic session may be used with any type of protocol, and the one-time write grant function may be used with any request and response-driven protocol (and not just HTTP).

The techniques described above are not limited to the intermediary being an edge server within an overlay network; thus, the above methods should be generalized with respect to any third party entity (system, device, machine, program, process, execution thread, etc.) and not just the CDN edge server as described.

The approach provides the overlay network and its customers many advantages. It removes from the overlay network all asymmetric cryptography for the customer, thereby significantly reducing processing and storage expense and requirements. It removes from the overlay network all private keys for the customer. It removes from the overlay network all public certificates for the customer. It provides data authenticity and integrity guarantees to cached items. The approach as described places the origin in complete control of what is private data without the overlay network provider's explicitly-required assistance.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server. There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

What is claimed is as follows:

1. A computer program product in a non-transitory computer readable medium for use in a data processing system comprising a hardware processor, the data processing system operating as an intermediary between first and second computing entities, the first and second computing entities having established between them an active cryptographic session, the computer program product holding computer program instructions that, when executed by the data processing system, are operative to:
   receive from the second computing entity a first instruction to splice into the active cryptographic session;
   splice into the active cryptographic session and carry out at least one action with respect to information within one of: an encrypted request, and an encrypted response flowing through the intermediary;
   receive from the second computing entity a second instruction to shunt out of the active cryptographic session; and
   shunt out of the active cryptographic session, after which access by the intermediary to information within the encrypted request or the encrypted response is revoked under the control of the second computing entity.

2. The computer program product as described in claim 1 wherein the active cryptographic session is a TLS session.

3. The computer program product as described in claim 1 wherein the first instruction includes a decryption key associated with the active cryptographic session.

4. The computer program product as described in claim 1 wherein the second instruction is associated with a renegotiation of the active cryptographic session.

5. The computer program product as described in claim 1 wherein the first computing entity is a client application, and the second computing entity is an origin server.

6. The computer program product as described in claim 1 wherein the at least one action injects into the active cryptographic session content cached at the intermediary.

7. The computer program product as described in claim 1 wherein the intermediary is restricted from visibility into an encrypted request or encrypted response except upon receipt from the second computing entity of the respective first instruction.

8. The computer program product as described in claim 1 wherein receipt of the first instruction enables the intermediary to decrypt data but not to contribute data to the active cryptographic session.

9. The computer program product as described in claim 1 wherein receipt of the first instructions enables the intermediary to perform a write operation with respect to the active cryptographic session.

10. The computer program product as described in claim 9 wherein the write operation is a one-time write operation.

11. A method operative within a machine operating as an intermediary between first and second computing entities, the first and second computing entities having established between them an active cryptographic session, comprising:
   receiving from the second computing entity a first instruction to splice into the active cryptographic session;
   splicing into the active cryptographic session and carry out at least one action with respect to information within one of: an encrypted request, and an encrypted response flowing through the intermediary;
   receiving from the second computing entity a second instruction to shunt out of the active cryptographic session; and
   shunting out of the active cryptographic session, after which access by the intermediary to information within the encrypted request or the encrypted response is revoked under the control of the second computing entity.

12. The method as described in claim 11 wherein the active cryptographic session is a TLS session.

13. The method as described in claim 11 wherein the first instruction includes a decryption key associated with the active cryptographic session.

14. The method as described in claim 11 wherein the second instruction is associated with a renegotiation of the active cryptographic session.

15. The method as described in claim 11 wherein the first computing entity is a client application, and the second computing entity is an origin server.

16. The method as described in claim 11 wherein the at least one action injects into the active cryptographic session content cached at the machine.

17. The method as described in claim 11 further including restricting visibility into an encrypted request or encrypted response except upon receipt from the second computing entity of the first instruction.

18. The method as described in claim 11 further including decrypting data upon receipt of the first instruction while inhibiting contribution to the active cryptographic session.

19. The method as described in claim 11 further including performing a write operation with respect to the active cryptographic session upon receipt of the first instruction.

20. The method as described in claim 19 wherein the write operation is a one-time write operation.

* * * * *